Figure 1:
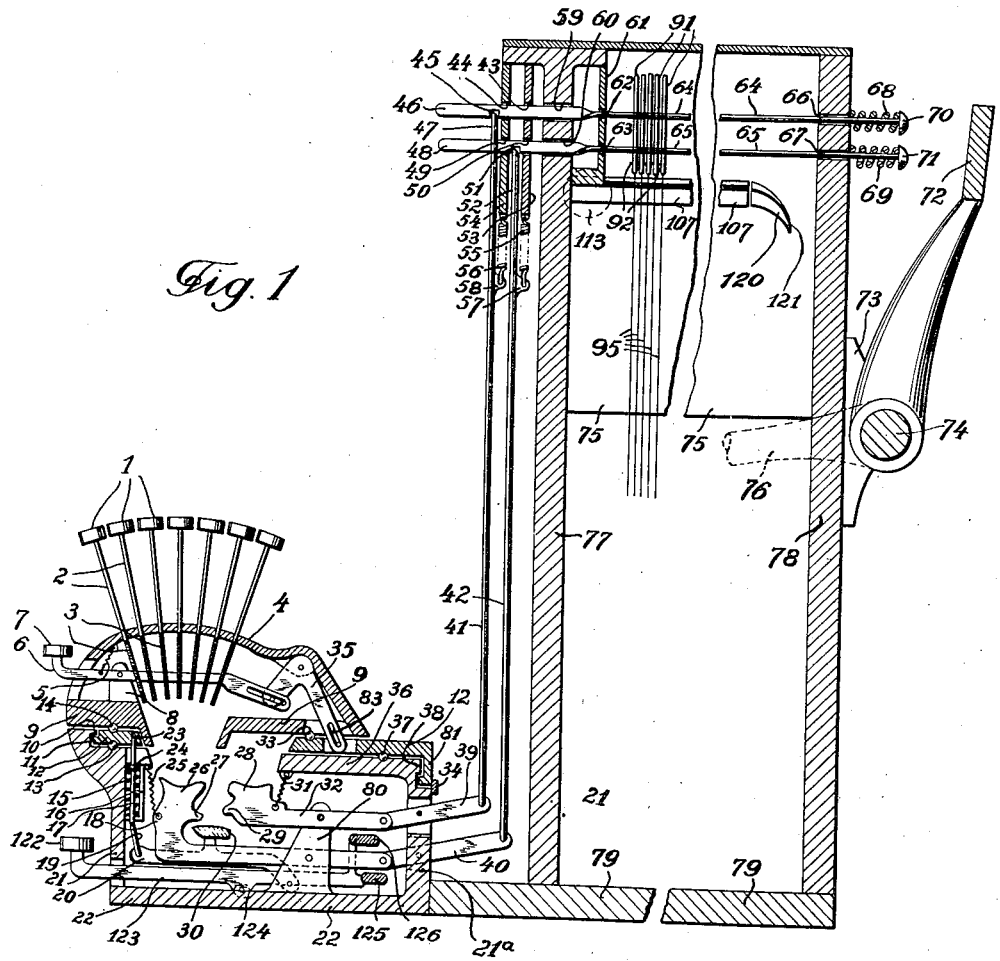

Oct. 15, 1940.  A. GRUENHUT  2,217,744
DEVICE FOR INDEXING, SELECTING, AND CLASSIFYING
FLAT SHEETS, CARDS, AND SIMILAR ARTICLES
Filed Dec. 18, 1937  6 Sheets-Sheet 1

INVENTOR:
Alfred Gruenhut
BY
ATTORNEY.

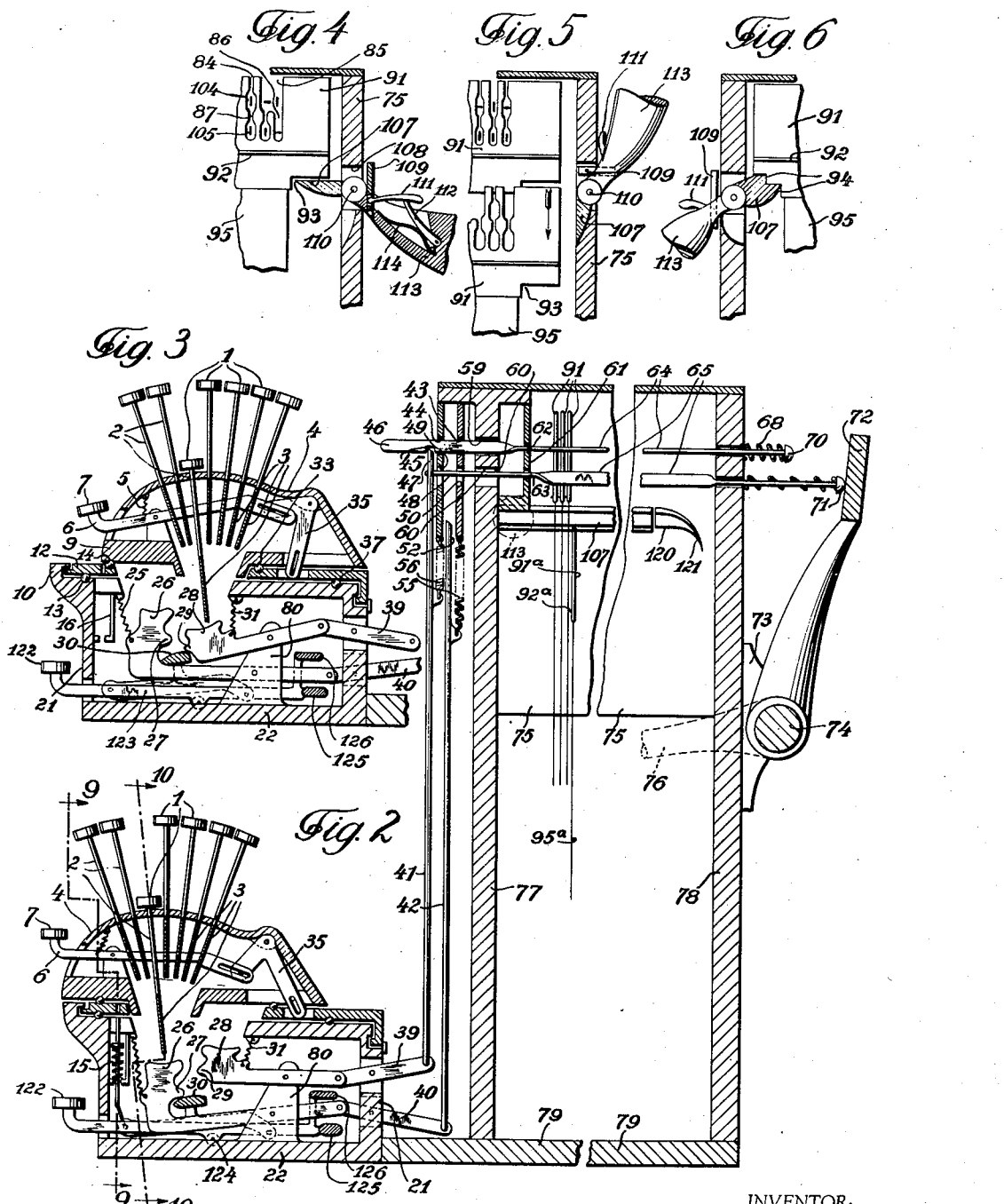

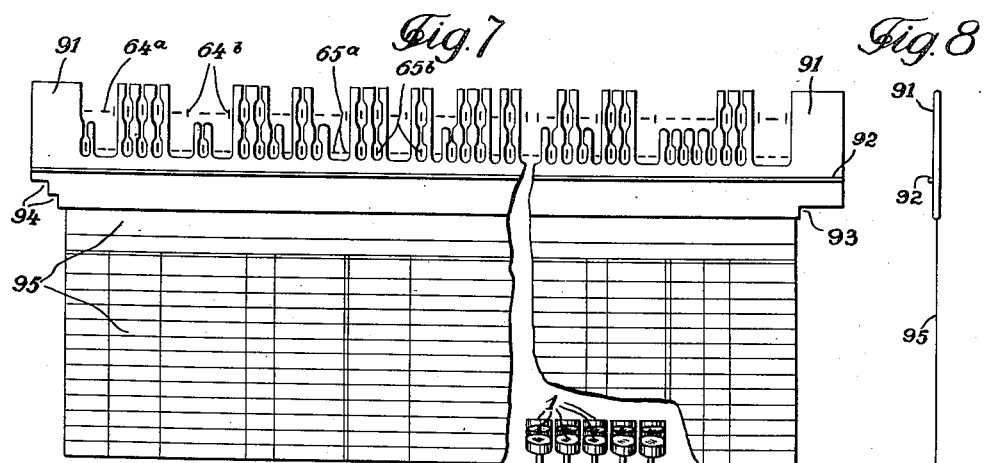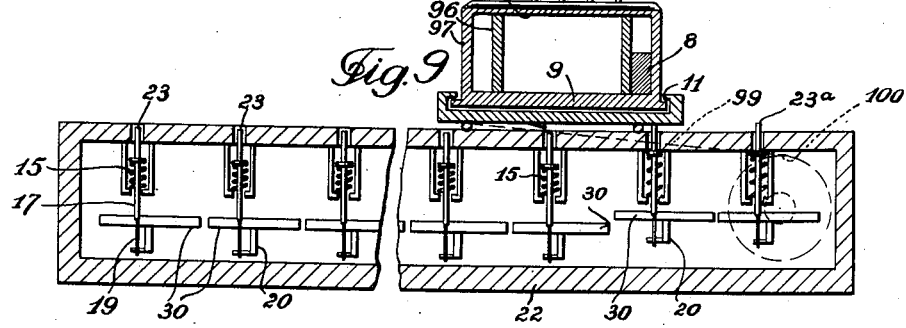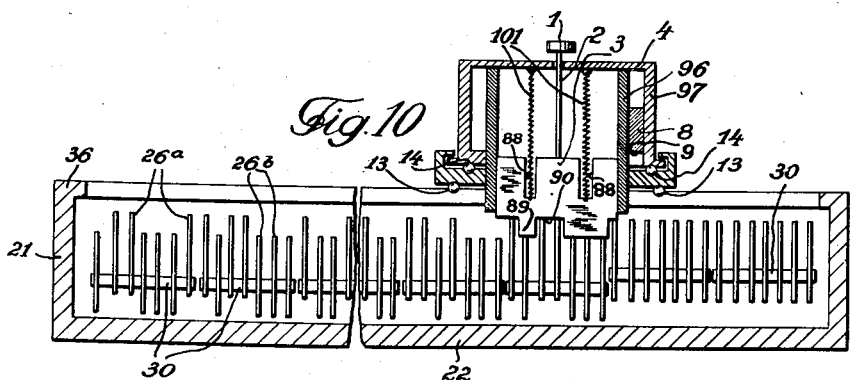

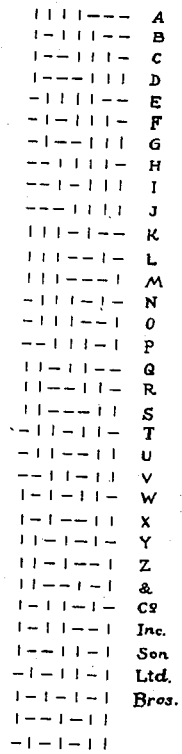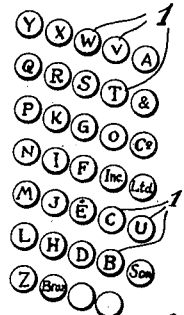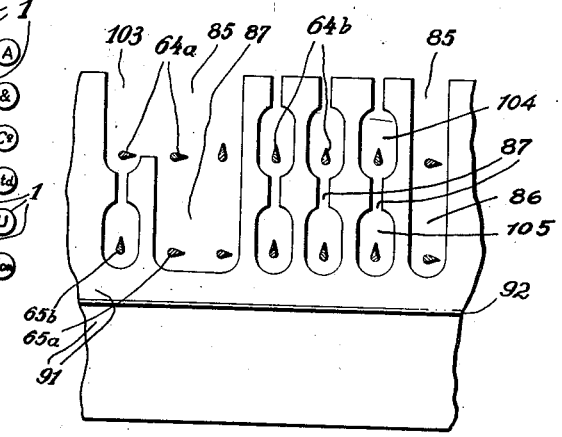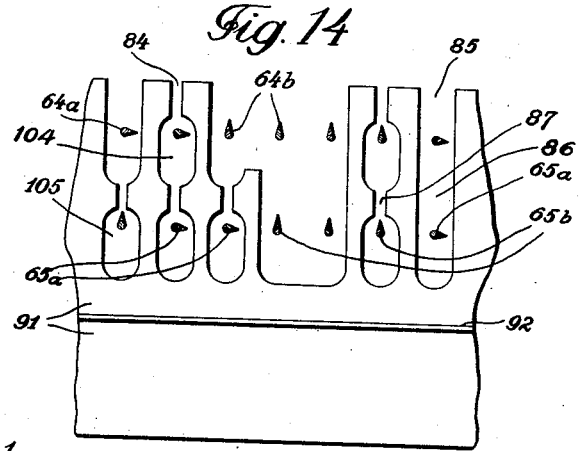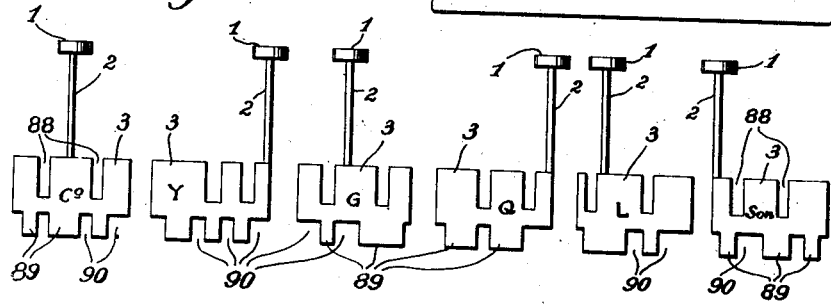

Oct. 15, 1940.    A. GRUENHUT    2,217,744
DEVICE FOR INDEXING, SELECTING, AND CLASSIFYING
FLAT SHEETS, CARDS, AND SIMILAR ARTICLES
Filed Dec. 18, 1937    6 Sheets-Sheet 5
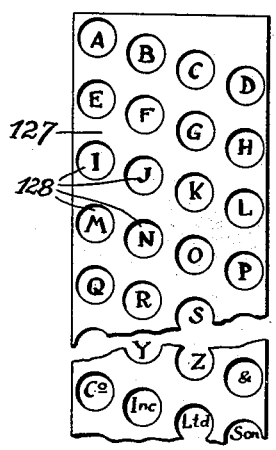
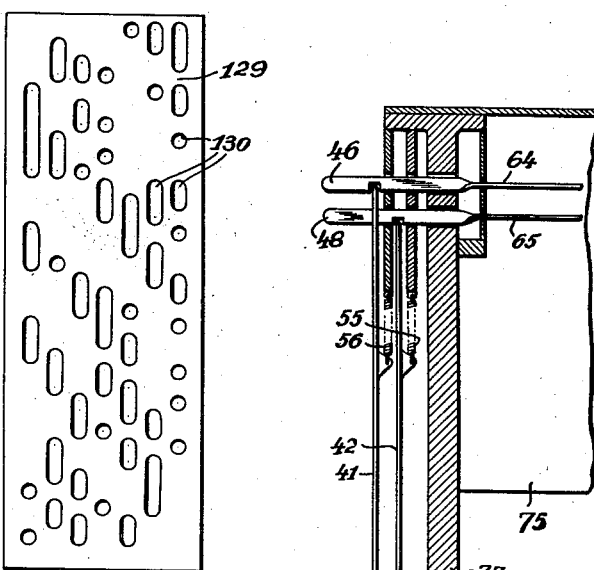
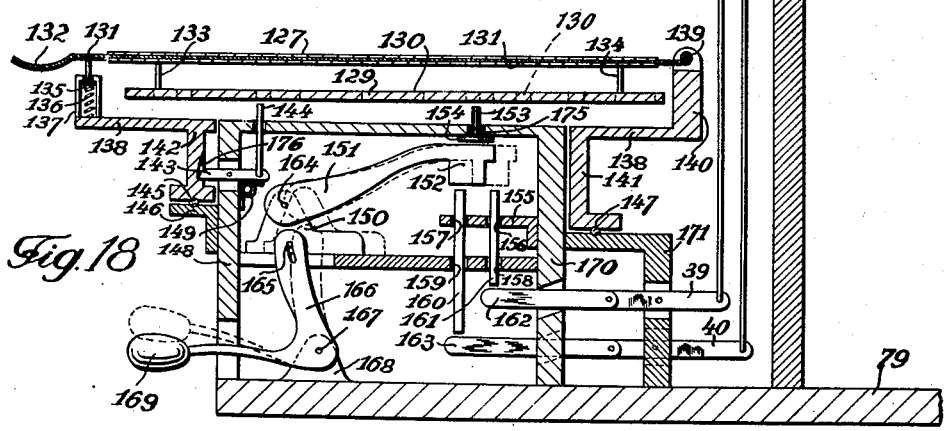
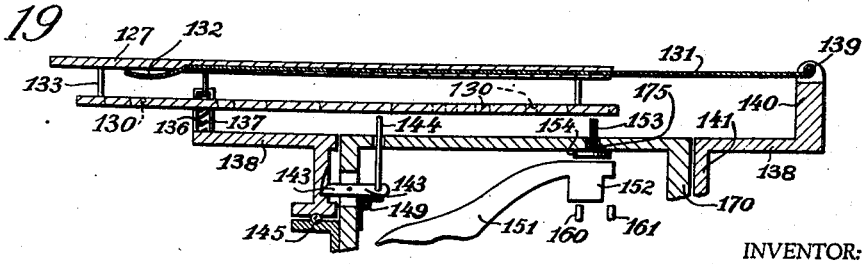
INVENTOR:
Alfred Gruenhut
BY
ATTORNEY.

Oct. 15, 1940.   A. GRUENHUT   2,217,744
DEVICE FOR INDEXING, SELECTING, AND CLASSIFYING
FLAT SHEETS, CARDS, AND SIMILAR ARTICLES
Filed Dec. 18, 1937   6 Sheets-Sheet 6
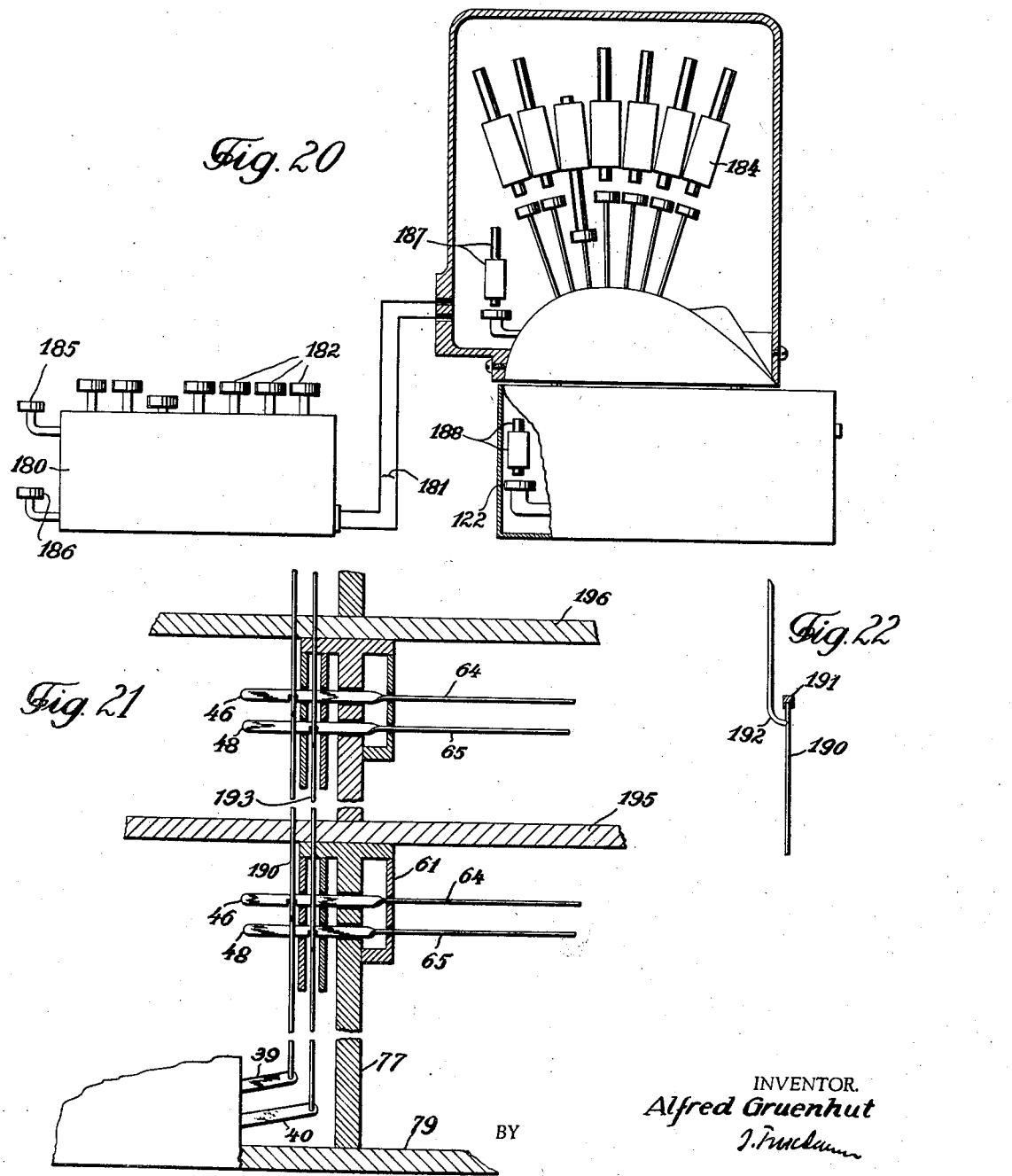
INVENTOR.
Alfred Gruenhut
BY
ATTORNEY.

Patented Oct. 15, 1940

2,217,744

UNITED STATES PATENT OFFICE 2,217,744

DEVICE FOR INDEXING, SELECTING, AND CLASSIFYING FLAT SHEETS, CARDS, AND SIMILAR ARTICLES

Alfred Gruenhut, New York, N. Y.

Application December 18, 1937, Serial No. 180,666
In Germany November 5, 1936

10 Claims. (Cl. 129—16.1)

My invention relates to a device for indexing, selecting and classifying flat sheets, cards and similar articles.

It is an object of this invention to select by means of a single mechanism any desired, individual card from a large staple arrayed and contained in a card filing cabinet, box or the like container.

It is a further object of my invention to solely effect the issue of the one desired card and to prevent the outcoming or issue and delivery of any other card from the card-staple.

It is still a further object of my invention to provide the cards with an additional device or stencil so that they may be used in any existing card index.

It is also an object of my invention to impart to the selected card an impact or a shock, which loosens this card out of the contact with the adjacent cards and facilitates its issue or removal from the cabinet.

It is a further object of my invention to provide a plurality of card cabinets, which preferably are located on top of each other and are controlled from a single operating device, e. g., key board or dial.

It is still a further object of the invention to automatically return the card selecting, e. g., locking and releasing means in their initial position.

It is also an object of my invention to provide means which permit of a compulsory reinsertion of the released cards in the card-cabinet.

It is known in card indexing devices of the present type to provide notches or recesses at the top-edge of the cards and rods cooperating with these notches, which support and lock or release the cards; each of these rods cooperates always with the same notch, which represents one letter of the alphabet. The position of each letter of the alphabet is therefore invariably determined by the corresponding notch.

The great drawback of these known card cabinets consists therein that not only the selected or desired card but also those cards are released by the actuation of the controlling rods, of which the markings, for instance the inscribed names, are constituted of the same combination of letters.

Supposing a card is to be selected, which bears the name "Bart," then with the known device, where one notch corresponds to one operating rod and to one letter of the alphabet also those cards will be issued, which bear names like "Tarb or "Trab" or "Rabt." To prevent this drawback a plurality of notches or slots and a corresponding number of operating rods are according to the invention coordinated to each letter of the alphabet, of which a part are moved in the card releasing position and a part remain in the locking position. According to the present embodiment of the invention a group of seven selecting rods and of seven slots is provided in coordination to each letter of the alphabet; four of such rods are turned in the releasing position and three remain in their locking position. The application of such plurality of slots and operating rods offers the possibility of actuating the rods in such manner, that the outcoming of undesired cards is fully prevented irrespective of the number of letter or other signs, of which the markings of the cards are composed.

With the known card indexing devices the locking rod of each letter always has its fixed and unchangeable position.

As already mentioned, with the known card indexing devices one operating rod and slot is coordinated to each constituent, letter, etc., of the markings or inscriptions of the cards and these means must be positioned at the same place; generally the first place is provided for the A, the second for the B, the third for the C and so forth.

According to my invention the selecting means for each letter may be located at different places, because the release or the locking of the individual letter is not due to one but to a plurality of selecting means which permit of an exceedingly great number of combinations, this being the principal difference of the invention over the known devices of similar type. The operating positions of the rods may therefore follow each other in any desired manner and preferably in the sequence of the letters constituting the markings of the cards.

According to another important feature of my invention, already existing cards may be used in my selecting card index and the necessity of rewriting the cards is therefore eliminated.

With this purpose in view card holders are provided and the cards are removably connected with such holders, the latter being provided with recesses or notches, which cooperate with the selecting, e. g., locking or releasing rods. These holders are made from durable, strong materials, e. g., metals; the workability and exact function of the indexing device is greatly prolongated thereby because the slots and recesses cannot be enlarged or torn out, which easily happens, when such operating means are provided in the cards.

In my card indexing system several cabinets may be employed, which are located on top of and/or adjacent to each other. In this case the selecting devices of the different card boxes are connected with each other by means of connecting members. The card controlling means of the different boxes are connected with each other in such manner that the desired card may be selected in whatever box it is contained and independently of its location in the individual box or cabinet.

According to one form of the invention a keyboard is provided to control the card selecting means, e. g., to shift the selecting rods in their locking or releasing position. The device may be arranged in such manner that the cards are selected by remote control, e. g., by electrical control. In this case the selecting device actuates electrical contacts which according to their different constructions yield different electrical currents, which in turn actuate the selecting mechanism of the card cabinets. The selected cards may be pushed out of the cabinets in the customary manner or they fall according to the invention out of the cabinet, in which case the cabinets are constructed without bottom.

In those cases, where an unusually great number of individuals, e. g., customers are to be enlisted in the card index and where it is therefore necessary to mark the cards for exact identification of those individuals having the same last name with their Christian names and/or addresses, the cards, of which the size naturally is limited by the dimensions of the cabinet, may not have the necessary width, to receive the then necessary number of slots. In such cases the slots are arranged in the cards or in the holders in several rows above or adjacent each other and corresponding sets of selecting rods are provided, to cooperate with such slot-rows. In order to control the different sets of operating rods from one key board, means are provided to shift the rods according to the requirements.

As previously mentioned it is an important feature of this invention that the selecting devices, which correspond to the individual letters, are not restricted to certain predetermined places but may follow each other in the same succession as the letters of the markings or inscriptions on the cards irrespective of the fact, how often such same letter occurs. This is achieved by the application of groups of selecting rods and slots corresponding to each individual letter of the alphabet or other suitable signs, which permits of a great variety of combinations sufficient for the whole alphabet and any additional signs.

To meet these requirements preferably at least seven selecting devices, e. g., rods and slots are coordinated to each letter. Some, for instance three of these operating devices or locking rods are not actuated and remain in their locking position, whereas the other four selecting devices are turned in their releasing position. The same result will be achieved if four out of seven selecting rods remain in their locking position, while the remaining three selecting rods are turned into their releasing position. The recesses in the holders correspond to the inscriptions or the marking words on the cards and are arranged in the same succession as they occur in the latter.

One push-button or key is provided to simultaneously actuate the groups of the seven selecting devices corresponding to one letter.

If several rows of locking rods and several rows of corresponding slots are provided, the slots should be arranged in such manner that the slots near the edge of the holders correspond to the slots being further away from the edge. If, however, the locking rods of those slots being further away from the edge are turned in order to select a card the provision of the slots near the edge need not to be changed.

The slots in the cards or in the holders are shaped in a manner which permits of a short displacement of the cards before they reach the actual locking or releasing position. By this short preliminary movement the cards are loosened out of their contact with the adjacent cards and their issue from the cabinet is greatly facilitated thereby. With these and other objects in view several embodiments of the invention are illustrated by way of example in the annexed drawings, in which Fig. 1 is a longitudinal section of the combined card cabinet and the selecting key board in its inoperative position, Fig. 2 is a similar section with one key being pressed down and the corresponding operating rod being in its release position, Fig. 3 is a vertical section of the selecting keyboard, similar to Fig. 2, the key board being shifted to control a second row of operating rods, Fig. 4 is a partial vertical section at an angle of 90° to Fig. 1 of the impact imparting device in its inoperative position, the card holders being supported thereon, Fig. 5 is a section similar to Fig. 4 the impact imparting device being shown in its operative position, the selected card being released and free to fall down, and the other cards being locked by the operating rods, Fig. 6 is a vertical section of the impact imparting device similar to Fig. 5 on the opposite side of the card cabinet, Fig. 7 is a front view of the card bearing holder, Fig. 8 is a side view of the card and of the holder carrying said card, Fig. 9 is a section on line 9—9 of Fig. 2, Fig. 10 is a section on line 10—10 of Fig. 2, Fig. 11 is a scheme showing the operating rods relative to the letters of the alphabet and to some additional signs in their releasing position, whereby the actuated rods are marked with a vertical line "|" and the nonactuated rods are marked with a horizontal line "—", Fig. 12 is a top view of the key board, Fig. 13 is an enlarged view of a part of the card holder, the operating rods being in the release or card-issuing position, Fig. 14 is a view similar to Fig. 13, the operating or selecting rods being in the card locking position, Fig. 15 is a front view of the keys and of the selecting plates connected thereto, Fig. 16 is a top view of the selecting dial of a second embodiment of the invention, Fig. 17 is a top view of the selector-slide operated in connection with the selecting dial, Fig. 18 is a vertical section similar to Fig. 1 of the second embodiment of the invention, Fig. 19 is a vertical section of a modified dial-carrier, Fig. 20 is a front elevation with parts broken away of a modification of the invention which permits remote control of the card cabinet, Fig. 21 is a vertical section of another modification of the invention showing two superposed card cabinets, and Fig. 22 is a side view of one of the rods actuating the locking rods as shown in Fig. 21.

Referring to the drawings, the embodiment of my invention as shown more particularly in Figs. 1 and 2 consists of a selecting device or selector and a card cabinet or box. The selector consists of a housing having front and rear walls 21 and a base plate 22 (Figs. 1, 2, 3, 9, 10) containing levers 26, 28 and keys 30 and of a carriage having two bottom plates 9 and 12 (Figs. 1, 2, 3), a rear plate 81, a cover 4 and side parts 97 spaced from part 96 (Figs. 9, 10). The carriage supports a key board provided with keys consisting of a button 1, a rod 2, a plate 3 (Figs. 1, 2, 3, 10) and a switch bar with button 7 and rod 6. Rod 6 is pivoted in protruding part 8 of bottom plate 9. Bottom plate 12 is received in the recess between projection 10 and surface 11 of housing 21, 22. Housing 21, 22 is provided with horizontal plate 36 supporting plate 81 of the carriage.

The card cabinet consists of front and rear walls 77 and 78, side walls 75 and base plate 79; it contains the card operating or selecting rods 64 and 65 and cards 95 carried by the holders 91, the latter being supported by the rods 64, 65.

If key 1 is pressed down, corresponding plate 3 (Fig. 15) actuates a certain number of levers 26 (Figs. 1, 10) and presses them down. Thereby, these levers move to their operating position, as shown in Fig. 2. Plate 3 is constructed in such manner, that it always contacts with a predetermined group for instance four of the seven levers 26 and presses them down, while the other three levers 26 of this group remain in their original locking position. The plates 3 of the individual keys are differently constructed insofar as the same number, e. g., four levers is actuated but always in a different succession or sequence.

In order to obtain this result the plates 3 are provided with projections 89 and recesses 90 (Fig. 15) corresponding to the scheme which is shown on Fig. 11. If lever 26 is pressed down, its nose 27 contacts with a key 30 (Figs. 2, 10) which is moved downwardly. The key 30 is connected with the pivot 17 by means of the connecting members 19 arranged on lever 20 fastened in turn on key 30 (Figs. 1, 9). Pivot 17 carries a pin 23 (Fig. 1). Pivot 17 is surrounded by a spring 15, which together with pivot 17 is encased in a box 16. The spring 15 pushes upwardly against plate 24 on the pivot 17 to press the pivot 17 and pin 23 against the housing in upward direction. If by pressing down key 30 by means of the levers 27 the pin 23 is moved out of its original position, the carriage is free to advance. The carriage is pulled forward by a spring 100 and a string 99 (Fig. 9) as used in a similar manner in type-writers. The carriage is advanced, until it is stopped by the next pin 23. The number of the pins 23 corresponds to the number of groups of seven levers 26. These levers are pivotally supported on the stand 80 (Figs. 1, 2, 3) and connected with members 40, the latter being pivotally fastened to the rear-wall 21ᵃ of the housing. On the other end of the member 40 a rod 42 is provided which is enlarged on its upper part 52. Part 52 fits into recess 51 of part 48 of locking rod 65, which projects beyond the housing 77 and is twisted by 90°. Spring 55 holds part 52 in its position. By pressing key 1 lever 26 is actuated which moves member 40 and rod 42 downward. Hereby the enlarged part of 52 of rod 42 is pulled out of recess 51. The locking rod 65 is freed thereby and spring 69 (Fig. 1) pulls the same against the rear wall 78 of the housing (Fig. 2).

Key 1 pushes down with its projections 89 four levers 26; therefore by the actuation of key 1 always four locking or operating rods are freed. Part 48 of the locking rod 65, which projects beyond housing front wall 77, is twisted by 90°. Part 48 and rod 65 pass through a slot 63 (Figs. 1, 2) of plate 61 and thereby locking rod 65 is correspondingly twisted by 90° if part 48 moves through slot 63. After having completed the selecting action levers 26 are pushed back by springs 25 into their initial position (Fig. 1), springs 25 being fastened on noses 18 of levers 26.

After a whole row of lever groups 26 have been actuated the carriage is switched to a second row of lever groups. This switching action is performed by key 7. In actuating key 7 the upper part of the carriage is moved so that plate 3 of key 1 contacts with levers 28 instead of 26. Levers 28 are provided with rods 32 pivoted in stand 80 and with noses 29 operating in the same manner as noses 27 and pressing down the keys 30 (Figs. 1, 2, 3). Levers 28 influence a rod 41 by means of a member 39. The upper part of member 47 is enlarged and reinforced. Part 47 fits into recess 45 which is cut into part 46 of locking rod 64 projecting beyond housing front wall 77. This arrangement operated in exactly the same manner as described in connection with lever 26 and operating rod 65.

After the selecting action is completed, the tilting device (Figs. 4, 6) is actuated by press-button 111, which moves pin 109 so far downward that it may be pushed through hole 108. Then the tilting device may be operated (Fig. 5) and all cards supported on rail 107 by means of recess 93 (Fig. 4) and 94 (Fig. 6) of holder 91 (Figs. 4, 5, 6, 7) slide down until they are caught with their slots 84 and 87 (Fig. 14) by the locking rods 64 and 65. The selected or desired card falls into the lower part of the cabinet (Figs. 2 and 5). After this the device is returned to its initial position. This is attained by the actuation of lever 76 (Fig. 1) being pivotally mounted at 74 on member 73 arranged on rear wall 78 of the housing. Lever 76 is provided with a rail 72 on its opposite end which extends over the whole rear wall 78 supported by bottom wall 79 of the housing. Lever 76 engages all ends 70, 71 of rods 64, 65, respectively and thereby returns all operating rods 64, 65 to their initial position.

The apparatus is further provided with a spring 5 (Figs. 1, 2, 3) which pushes lever 7 to its initial position, a bell crank 35 (Figs. 1, 2, 3) provided with a slot 83 and transmitting the movement of lever 7 into a displacing movement of the carriage from that of Fig. 1 to that of Fig. 3, rolls or balls 13, 14, 33, 37 (Figs. 1, 2, 3), easing the movement of the carriage, a rail 34 mounted on plate 36, which prevents the slipping out of the carriage of its support, springs 25 and 31 returning levers 26 and 28 (Figs. 1, 2, 3) and spring 101 (Fig. 10) returning keys 1 into their initial position.

In order to save in space these springs are located in recesses 88 (Fig. 10) of plate 3. The tilting device (Figs. 4, 5, 6) is provided with a spring 114 on its handle 113, which returns button 111, 112 into its initial position. The tilting device is pivotally mounted on axis 110. Plates 53 and 54 are mounted in front of the housing wall 77 in order to support rods 41 and 42 and to support springs 55 and 56. Springs 55 and 56 are fixed at 57 and 58 and have the tendency to return rods 41 and 42 to their initial position. Round openings 43, 44 and 49, 50 are provided in the plates 53, 54; the locking rods pass with their twisted parts 46, 48 through these holes. Similar holes 59 and 60 are provided for the same purpose in the front wall 77 of the housing. Narrow slots 62 and 63 are provided in plate 61 making it possible for the rods 46, 64 and 48, 65 to be turned by 90° if they are passed through these slots. Holes 66 and 67 through which the locking rods 64, 65 may pass are provided in the rear wall 78 of the housing; buttons 70 and 71 prevent the removal of springs 68, 69 and of the rear end of the locking rods. Springs 68, 69 press against buttons 70 and 71 in order to automatically move backward the locking rods; at the same time they are turned by 90°.

The holders 91 are made from resistant material, for instance aluminium, and the same are provided with a transversal projection 92 spacing the cards as may be seen in Fig. 1. The recesses may be provided in one or in several rows. They are arranged according to the scheme, which is shown in Fig. 11. For each letter or other signal several but not less than seven recesses are provided, of which some have wide and some have narrow slots or exists. Through the wide exists 85, 86 (Figs 13, 14) also those rods may pass, which have remained in their locking positions 64a, 65a. The narrow exists 84, 87 permit only those rods to pass, which are moved in the release position 64b, 65b. Recesses 104, 105 are elongated in order to contribute to the whole card-staple an impact in the moment where the tilting devices release the cards; thereby the cards are loosened and this greatly facilitates their issue. The desired card falls past the locking rods as shown in Fig. 13.

Fig. 14 shows the holder of a card, which is not selected and which after sliding from rail 107 (Fig. 5) by means of the releasing action of the tilting device is suspended on the selecting rods 64a, 65a, which are in their locking position. If two or more recesses 103, 105 are located with their wide exists adjacent to each other, a single opening may be provided in lieu of the two adjacent openings (Figs. 13, 14). This facilitates the selecting action by reducing the friction.

The holders are suitably made in such manner, that the recesses in the row being further away from the edge represent the main marking word or inscription for instance the last name of the customer. Next to the last name the initials of the Christian name or the entire Christian name may be located, next to that the address and any other markings as this will be admitted by the number of recesses in the holder. Spaces between the words and inscriptions should be avoided.

The recesses of th row being further away from the edge are made first. Then, the next row of recesses which is nearer to the edge is punched. It should be taken care that those recesses, which have narrow exits and which are located above recesses of a row being further away from the edge and having wide exits, must be provided with wide exits. If the recesses of a row being further away from the edge, have narrow exits, the recesses of the next row nearer the edge can be fitted with wide or narrow exits according to the selected scheme (Figs. 13, 14, 15).

The cards are selected in the following manner:

It is assumed that the selector is in its initial position as shown in Fig. 1. The keys 1 are pressed in accordance with the letters constituting the inscriptions on the card. When the carriage has reached the end of its rail the next row is put in operation by means of key 7 and the following letters are selected. After the selecting procedure is completed the tilting device (Figs. 4, 5, 6) is actuated, whereby an impact is applied to the cards and the selected card is issued.

A simplified embodiment of the invention is shown in Figs. 16 to 19. The key board is replaced by a dial 127 (Figs. 16, 18). This dial is provided with holes 128 corresponding to the size or thickness of a finger. A plate 129 is fastened to the dial by means of rods 133 and 134 (Figs. 17, 18). Plate 129 is provided with perforations 130 which correspond to the scheme shown in Fig. 13.

The device is operated as follows:

In order to select the letter of the marking words or inscriptions on the cards a finger is stuck into those holes 128, corresponding to the letters which form the marking words. Then the plate is moved outwardly as in Fig. 19 by the finger until a stop is reached, which may consist of the box 137 or its extension provided with a spring 136. As soon as the stop is reached, plate 127 which is slidable in a rail 131 and downward movable by means of a joint 135, is pressed down by the part 132. Since plate 129 is rigidly connected with dial 127, plate 129 is also pressed down. According to the dialing of a certain letter or sign in dial 127 the perforations 130 of plate 129 are in such position above pins 153, that the pins are pressed down which correspond to the selected letter of the scheme. Pins 153 have an enlarged lower part 154, which is shaped in such manner, that the pins 153 may not be pressed through openings 175, in which they are supported. The enlarged part 154 rests on levers 151, of which a plurality is provided. These levers have a key-bit shaped enlargement 152 which is formed in such manner, that levers 151 rest upon pins 160 and 161 according to the position, in which the levers are moved by the shifting device 169 having an upper arm 166 and pivoted at 167 on stand 168. Arm 166 of shifting device 169 is provided with slot 165 engaging a pin to shift support 150. The different positions are indicated in dotted lines. Levers 151 are pivotally mounted with their axis 164 in a support 150. By pressing lever 169 up or down, support 150 and therewith all levers 151, 152 are shifted in such manner, that they rest either on the pins 160 or on the pins 161. Pins 160 and 161 are mounted in openings 156, 157 provided in wall 155 supported by upright 170 and in openings 158, 159 provided in a wall extending between uprights 148 and 170. Pins 160 rest with their lower end upon connecting members 163, 40 and pins 161 upon connecting members 162, 39. The transmission of the movement from the connecting members 39, 40 to the rods 41, 42 is effected in the same manner as described in connection with Figs. 1, 2, 3.

Rail 131 is pivotally movably connected with blocks 140 at 139. Block 140 is rigidly connected with bearing 138 which consists of the guiding members 141, 142. Bearing 138 moves on rolls or balls 145, 147. On the front-side of rail 146 and on the rear side of housing 171 carriage 138 is automatically drawn in the one direction by a device which is similar to the usual construction of a type-writer. The carriage is stopped in such manner, that it always remains above such openings 130 of plate 129 or respectively over pins 153, that a certain predetermined number of pins is actuated if plate 129 is pressed down and another predetermined number of pins remain in their initial position. Carriage 138 is freed if lever 132 is pressed while at the same time plate 129 presses down on pins 144. Pins 144 actuate lever 143 in such manner, that this lever is moved out of a recess of the connecting member 142 and therefore does not stop carriage 138. By means of the spring 149 the lever 143 and the pin 144 are returned in their initial position. As long as plate 129 is pressed down, carriage 138 is not movable in spite of the fact that it is freed by lever 143 because it is locked by the cooperation of the openings 130 of plate 129 and the pins 153. Only if the lever 132 is freed carriage 138 moves as soon as plate 129 is moved upwards. Though the upward movement of plate 129 frees pin 144, lever 143 is for a short moment still in the upper part of recess 176 and during this moment carriage 138 moves to the next recess 176. The upward movement is effected by spring 136, which is located in the housing 137. Spring 136 presses against plate 135 and against the carriage 138. Rail 107, which supports holder 91 in its inoperative position, is shown in Fig. 1 in dotted lines. Rail 107 forms a part of the tilting device and is actuated by lever 113 (Figs. 1, 4, 5, 6). The extension 120, 121 of the rail 107 is however not movable and remains in the same position even if the tilting device is operated. This extension 120, 121 serves to introduce the cards into the cabinet. A plurality of cards is introduced simultaneously in such manner, that the cards rest with the recesses 93, 94 of the holders upon the guiding rail 120. By the actuation of the lever 122 all locking rods 64, 65 are moved to the release position but first the tilting device 107, 113 should be in its initial position. In this position, i. e. when all locking rods are in their release position the newly introduced cards may be filed on the rails 107 of the tilting device. After the introduction of the cards key 122 is moved into its original position. Thereby all rods 41, 42 are drawn downwardly. By actuation of rail 72 of lever 76 locking rods 64, 65 are moved into their original locking position. Key 122 is connected with the lever 123 which is pivotally mounted at 124 on the bottom of the housing. On the end of lever 123 opposite of key 122 rails 125, 126 are mounted; these rails actuate, if key 122 is operated, connecting members 39, 40 in such manner, that all locking rods in accordance with the actuation of key 122 are moved into the locking or the release position.

In Fig. 20 a modification of the invention is shown which admits of a remote control of the card holding cabinet. A box generally designated 180 and provided with an electric cord 181 bears the selecting keys 182. One of the keys 182 is depressed which closes an electric circuit, which in turn energizes one of the solenoids 184. The energized solenoid depresses the selected key 1 which, otherwise, operates as described above in connection with Fig. 1. For the sake of simplicity the carriage and its associated parts have not been shown in detail it being understood that the parts are substantially as shown in Fig. 1.

Switch key 7 is actuated by key 185 of box 180, while release key 122 is controlled by key 186. Keys 7 and 122 are depressed by solenoids 187 and 188, respectively. By means of this electrical control one as well as several card cabinets may be controlled from a box 180.

It is also possible to mechanically actuate several card cabinets arranged one on top of the other. This has been shown in Figs. 21 and 22. Rods 41, 42 shown in Fig. 1 have been replaced by rods 190, 193, respectively. Rod 190 shown in side elevation in Fig. 22 is provided with a nose 191 actuating part 46 of locking rod 64. Rod 190 is provided with a curved part 192 to permit free operation of rod 190 regardless of the position of parts 46, 48. The two housings shown in Fig. 21 have top walls 195, 196 provided with suitable holes to permit free passage of rods 190, 193. A plurality of cabinets may thus be actuated simultaneously by means of a single key board.

Having now described my invention, what I claim as new is:

1. In a card indexing and selecting device a card cabinet, groups of card selecting means in said cabinet coordinated to each individual sign or signal of the card markings, means to simultaneously operate, group by group, all selecting means in any one group, a predetermined number, exceeding two, of the selecting means of each group being selectively operable by said means to release certain cards while retaining the other cards.

2. In a card indexing device according to claim 1 each of said selecting groups comprising seven selecting means.

3. In a card indexing device according to claim 1, each of said selecting groups comprising seven selecting means of which three are selectively operable by said keys.

4. In a card indexing device according to claim 1 each of said groups comprising seven selecting means of which four are selectively operable by said keys.

5. In a card indexing and selecting device a card cabinet, groups of card selecting means coordinated to each individual sign or signal of the card markings, a key board comprising keys to simultaneously operate by means of a single key the predetermined number of selecting means of each of said groups, each of said keys comprising a plate having a plurality of projections and recesses, the selecting means comprising a predetermined number of selecting rods equal to the number of projections and recesses in said keys and further equal to the number of edge recesses in said cards.

6. Card indexing device according to claim 5 provided with a plurality of superposed rows of selecting means, each row being operated by said keys and means to shift said keys into operable position from one row to the other.

7. Card indexing device according to claim 5 provided with a plurality of superposed rows of selecting means and a corresponding number of rows of edge recesses in said cards, means to shift said keys into operable position from one row to the other, said rows of edge recesses being connected by contracted passages.

8. In a card indexing and selecting device a card cabinet, groups of turnable selecting rods in said cabinet coordinated to each individual sign or signal of the card markings, keys to simultaneously operate, group by group, all of the rods in any one group, a predetermined number, exceeding two, of rods of each group being selectively operable by said keys to release certain cards while retaining the other cards, each of said rods having one long and one short axis, a twist of 90° formed at one end of each rod, a guiding device in said cabinet to convert the twist into a turning movement, and means in said cabinet to support said selecting rods.

9. In a card indexing device according to claim 8 each of said groups of selecting rods consisting of seven rods.

10. In a card indexing and selecting device a card cabinet, groups of card selecting means in said cabinet coordinated to each individual sign or signal of the card markings, means to simultaneously operate, group by group all selecting means in any one group, said means comprising a perforated dialing plate, a slidable perforated plate underneath said dialing plate, the perforations of said last mentioned slidable plate corresponding to the signals constituting said card markings, a predetermined number, exceeding two, of the selecting means of each group being selectively operable by said last mentioned means to release certain cards while retaining the other cards.

ALFRED GRUENHUT.